(12) United States Patent
Terajima

(10) Patent No.: US 9,201,210 B2
(45) Date of Patent: Dec. 1, 2015

(54) LENS DRIVING DEVICE

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventor: Kokichi Terajima, Tokyo (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (HK); HUIZHOU DAYA BAY JSS OPTICAL TECHNOLOGY.CO., LTD., Huizhou (CN)

( * ) Notice: Subject to any disclaimer, the term of this patent is extended or adjusted under 35 U.S.C. 154(b) by 0 days.

(21) Appl. No.: 14/525,327

(22) Filed: Oct. 28, 2014

(65) Prior Publication Data
US 2015/0131174 A1 May 14, 2015

(30) Foreign Application Priority Data
Nov. 8, 2013 (JP) ................. 2013-231809

(51) Int. Cl.
*G02B 7/02* (2006.01)
*G02B 7/04* (2006.01)
*G03B 3/10* (2006.01)
*G02B 7/08* (2006.01)
*G02B 7/10* (2006.01)
*G11B 7/09* (2006.01)

(52) U.S. Cl.
CPC .. *G02B 7/04* (2013.01); *G02B 7/08* (2013.01); *G03B 3/10* (2013.01); *G02B 7/102* (2013.01); *G11B 7/0935* (2013.01)

(58) Field of Classification Search
CPC ............ G02B 7/08; G02B 7/04; G02B 7/102; G02B 7/023; G02B 7/026; G02B 7/02; G11B 7/0935
USPC .................. 359/824, 823, 816, 814, 822, 696
See application file for complete search history.

(56) References Cited

U.S. PATENT DOCUMENTS

| | | | | |
|---|---|---|---|---|
| 2012/0120513 A1* | 5/2012 | Kotanagi | ................ | F03G 7/065 359/824 |
| 2013/0044383 A1* | 2/2013 | Park | ....................... | G02B 7/023 359/824 |
| 2014/0340775 A1* | 11/2014 | Hsu | ..................... | H04M 1/0264 359/824 |

* cited by examiner

*Primary Examiner* — Ricky Mack
*Assistant Examiner* — Daniele Manikeu
(74) *Attorney, Agent, or Firm* — Hemisphere Law, PLLC

(57) ABSTRACT

The present invention aims to provide a lens driving device. Inclination generated by a lens support can be reduced when a camera shoots towards any direction, so that distortion cannot be generated for a shot image. Each of a front side spring component and a back side spring components includes an inner side retaining part, an outer side retaining part, two wrist parts, two inner side connecting parts and two outer side connecting parts. The two wrist parts extend along the circumferential direction and are used for connecting the inner and outer side retaining parts. The inner side connecting parts connect one ends of the wrist parts with the inner side retaining part. And the outer side connecting parts connect the other ends of the corresponding wrist parts with the outer side retaining part. The extending angle of each wrist part is at least 180 degrees.

2 Claims, 9 Drawing Sheets

US 9,201,210 B2

LENS DRIVING DEVICE

CROSS-REFERENCE TO RELATED APPLICATIONS

This application claims priority to Japanese Application No. 2013-231809 filed on Nov. 8, 2013 in Japan Patent Office, the contents of which are incorporated by reference herein.

BACKGROUND OF THE INVENTION

1. Field of the Invention

The present invention relates to an electromagnetic driving type lens driving device used in a camera assembly for a mobile telephone.

2. Description of Related Art

FIG. 7 is an exploded view of an existing voice coil motor type lens driving device 20. Moreover, the direction the same as the direction of the optical axis O of the lens 25 is taken as Z axis direction, and two directions which are orthogonal to the Z axis and are mutually orthogonal are taken as X axis direction and Y axis direction. Moreover, the side of an object to be shot is taken as the front side (front of the Z axis, +Z side) of the direction of the optical axis O (Z axis direction). Moreover, a direction of an axis formed by rotating the X axis around the Z axis by 45 degrees is taken as P axis direction, and a direction of an axis formed by rotating the Y axis around the Z axis by 45 degrees is taken as Q axis direction.

The lens driving device 20 includes an annular magnet yoke 22, four permanent magnets 23, a lens support 24, a lens 25, a coil 26, a front side spring component 21A, a back side spring component 21B and a box body 27.

The magnet yoke 22 includes an outer circumference wall 22a formed to be a quadrangular barrel shape when being observed in the Z axis direction, an inner circumference wall 22b formed to be a cylindrical shape, and a tubular top surface 22c for mutually connecting the +Z side of the outer circumference wall 22a with the +Z side of the inner circumference wall 22b. The permanent magnets 23 are mounted on the inner sides of four corners of the outer circumference wall 22a of the magnet yoke 22.

The lens support 24 is formed to be a cylindrical shape, and the lens 25 is retained on the inner circumference side of the lens support 24. And the lens support is supported by the front side spring component 21A and the back side spring component 21B on the inner circumference side of the inner circumference wall 22b of the magnet yoke 22, so that the lens support 24 can move along the Z axis direction. The coil 26 is positioned between the inner circumference wall 22b of the magnet yoke 22 and the permanent magnets 23 with intervals, and is mounted on the outer circumference side of the lens support 24.

As shown in FIG. 8, the front side spring component 21A is integrally formed to be annular. The front side spring component 21A includes: an inner side retaining part 21a which is arranged on the inner circumference side and formed to be circular ring-shaped, an outer side retaining part 21b which is arranged on the outer circumference side and formed to be square frame-shaped, and two wrist parts 21c which are zigzagged along the circumferential direction. One ends of the wrist parts are connected with the inner side retaining part 21a, and the other ends of the wrist parts are connected with the outer side retaining part 21b. These wrist parts 21c are respectively arranged at the diagonal position of the outer side retaining parts 21b in the P axis direction.

The back side spring component 21B is divided into two parts along the Y axis direction. The back side spring component 21B includes: two inner side retaining parts 21a which are arranged on the inner circumference side and formed to be circular arc-shaped, two outer side retaining parts 21b which are arranged on the outer circumference side and formed to be コ-shaped, and two wrist parts 21c which are zigzagged along the circumferential direction. One ends of the wrist parts are connected with the inner side retaining part 21a, and the other ends of the wrist parts are connected with the outer side retaining part 21b. These wrist parts 21c are respectively arranged at the diagonal position of the outer side retaining parts 21b in the Q axis direction.

The inner side retaining parts 21a of the front side spring component 21A and the back side spring component 21B are connected with the front side and the back side of the lens support 24 in the Z axis direction. The outer side retaining parts 21b are respectively connected with the front side and the back side of the magnet yoke 22 in the Z axis direction arranged on the side of the box body. Moreover, four supporting columns 27a are arranged at four corners of the box body 27, and the four corners of the magnet yoke 22 are inlaid in the inner side of the supporting columns 27a, so that the lens driving device 20 (referring to FIG. 7) is formed.

When the coil 26 is electrified so as to enable the lens driving device 20 to realize focusing, pushing force towards the front of the Z axis direction is applied to the coil 26, so that the lens support 24 moves forward in the Z axis direction to the position that the pushing force and restoring force generated by the front side spring component 21A and the back side spring component 21B achieve a balance. At this moment, when the wrist parts 21c of the front side spring component 21A and the wrist parts 21c of the back side spring component 21B are connected with the lens support 24 at a same angle in an undistorted/untwisted manner (for example, the wrist parts 21c of the front side spring component 21A and the wrist parts 21c of the back side spring component 21B are disposed at the diagonal position in the P axis direction all together), the lens support 24 moves along the Z axis direction for focusing, and the lens support 24 is likely to rotate or incline around the P axis.

Therefore, the wrist parts 21c of the front side spring component 21A are arranged at the diagonal position in the P axis direction, and the wrist parts 21c of the back side spring component 21B are arranged at the diagonal position in the Q axis direction formed by rotating the Y axis by 90 degrees when being observed in the direction of the optical axis O. Therefore, when the lens support 24 moves towards the Z axis direction along with the focusing action, the lens support 24 can be prevented from rotating or inclining around a specific axis perpendicular to the Z axis as mentioned above (for example referring to patent documentation 1: JP Patent No. 2008-26619).

Under the condition that the image is shot by the camera, the camera may face to different directions sometimes, or the camera rotates around the optical axis O of the lens 25. Namely, the camera takes photos at a posture that the optical axis O of the lens 25 faces to the vertical direction, or at a posture that the optical axis O of the lens 25 faces to the horizontal direction, or at a posture that the lens 25 rotates around the optical axis O towards the horizontal direction.

As shown in FIG. 9A, FIG. 9B and FIG. 9C, for example, under the condition that the camera shoots by enabling the lens driving device 20 to rotate around the optical axis O at the manner that the optical axis O of the lens 25 faces to the horizontal direction and the P axis direction faces to the vertical direction, load W generated by the lens 25, the lens support 24 and the coil 26 is applied to the wrist parts 21c of the front side spring component 21A and the wrist parts 21c of the back side spring component 21B towards the P axis direction.

As mentioned above, the wrist parts 21c of the front side spring component 21A are arranged at the diagonal position of the lens driving device 20 in the P axis direction, and the wrist parts of the back side spring component 21B are arranged at the diagonal position of the lens driving device 20 in the Q axis direction. On the other hand, the spring strength of the wrist parts 21c of the front side spring component 21A is different based on the load W suffered in different directions, and the spring strength generated in the P axis direction is lower, the spring strength generated in the Q axis direction is higher. Moreover, the spring strength of the wrist parts 21c of the back side spring component 21B is bias in different directions, and the strength in the P axis direction is higher, the strength in the Q axis direction is lower.

Therefore, as shown in FIG. 9D, even if the load W is equivalently applied to the wrist parts 21c of the front side spring component 21A and the wrist parts 21c of the back side spring component 21B respectively, and the displacement in the front of the lens support 24 is greater than the displacement at the back of the lens support 24 towards the P axis direction, so that the lens support 24 inclines around the Q axis direction. Moreover, under the condition that the optical axis O of the lens 25 is disposed in the horizontal direction and then the Q axis direction faces to the vertical direction, oppositely, the displacement at the back of the lens support 24 is greater than the displacement in the front of the lens support 24 toward the Q axis direction, so that the lens support 24 inclines around the P axis direction.

As mentioned above, under the condition that the optical axis O of the lens 25 in the existing lens driving device 20 faces to the horizontal direction, the lens 25 is likely to incline, so that the image imaged on the image sensor is likely to appear distortion and deformation.

BRIEF SUMMARY OF THE INVENTION

The foregoing and other exemplary purposes, aspects and advantages of the present invention will be better understood in principle from the following detailed description of one or more exemplary embodiments of the invention with reference to the drawings, in which:

In view of the existing problems, the present invention aims to provide a lens driving device. Inclination generated by a lens support can be reduced even if under the condition that a camera shoots towards any direction, so that distortion cannot be generated for a shot image.

A lens driving device includes: a lens support for retaining a lens; a box body disposed on the outer circumference side of the lens support; a plurality of spring components for supporting the lens support to move along the direction of the optical axis of the lens in a suspension manner; and an electromagnetic driving mechanism for driving the lens support towards the direction of the optical axis. The spring components includes a front side spring component, which is mounted in the front of the direction of the optical axis and is used for supporting the lens support; and a back side spring component, which is mounted at the back of the direction of the optical axis and is used for supporting the lens support. Each of the front side spring component and the back side spring component includes: a plurality of wrist parts extending along the periphery of the optical axis of the lens; an inner side retaining part which is arranged on the inner sides of the wrist parts and is connected to the lens support; and an outer side retaining part which is arranged on the outer sides of the wrist parts and is connected to the box body. One end of each wrist part is connected with the inner side retaining part, the other end of the corresponding wrist part is connected with the outer side retaining part, and the extending angle of each wrist part along the periphery of the optical axis are more than 180 degrees.

Therefore, the spring strength generated by the wrist parts of the front side spring component and the back side spring components is completely equivalent (equalization) in the directions perpendicular to the optical axis, so that strength deviation of the spring strength cannot occur in a specific direction. Therefore, even if under the condition that the optical axis of the lens is disposed towards the horizontal direction, and the lens driving device rotates around the optical axis, and the lens support is difficult to incline no matter how the rotation angle of the lens support is, therefore inclination generated by the lens support can be restrained, and the image without distortion and deformation can be shot.

Moreover, as a preferable embodiment of the present invention, a part, for one end of the corresponding wrist part to be connected with the inner side retaining part, of the front side spring component and a part, for one end of the corresponding wrist part to be connected with the inner side retaining part, of the back side spring component are mutually at corresponding positions formed by rotating the two parts by 90 degrees around the optical axis of the lens.

The wrist parts and the inner side retaining parts are connected at positions formed by rotating around the optical axis by 90 degrees, so that the lens support can stably move in parallel along the direction of the optical axis.

Moreover, the summary of the invention does not list all features required by the present invention, and auxiliary combination of these features can also become the present invention.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings, and the following embodiments do not limit claims in the present invention, and the combination of all features described in the embodiments does not necessary for solutions of the present invention.

Figure 1:
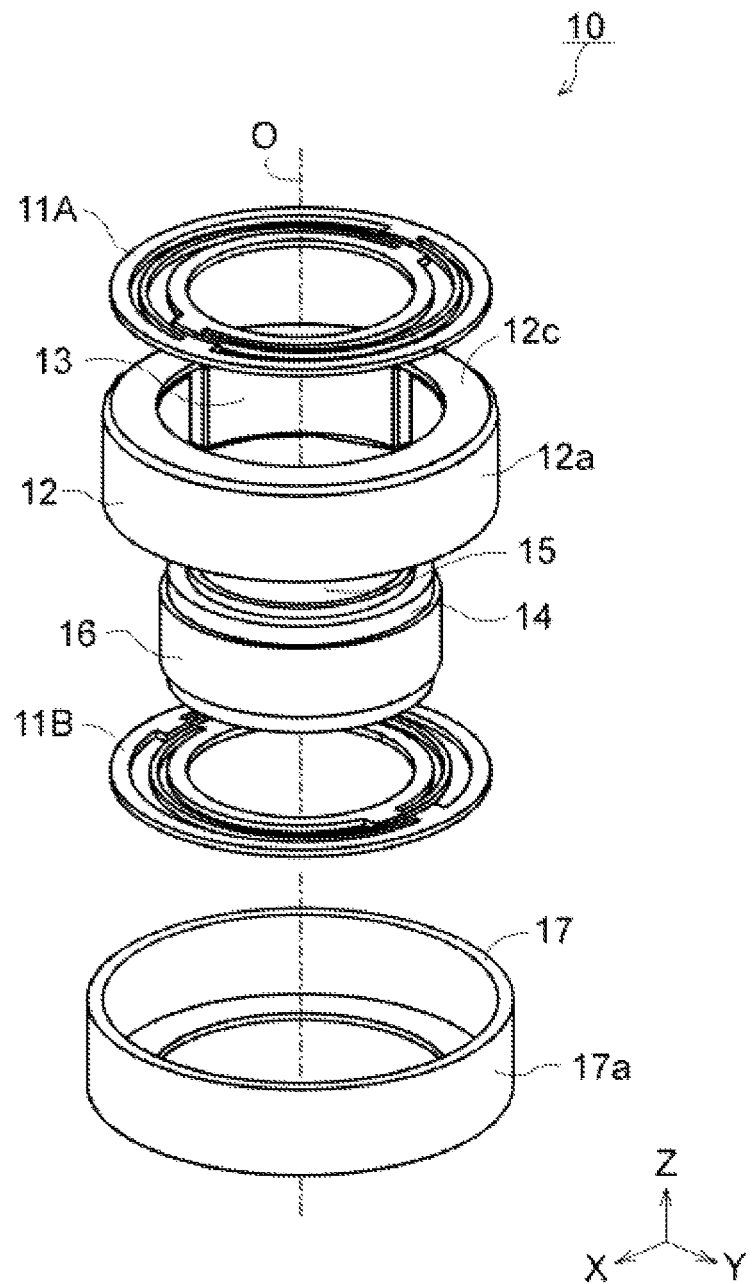
FIG. 1 is an exploded view of a lens driving device in according to an embodiment of the present invention.

FIG. 1 is an exploded view of a lens driving device 10 in according to an embodiment. Moreover, a direction the same as the direction of an optical axis O of the lens 15 is taken as Z axis direction, and two directions which are orthogonal to the Z axis and are mutually orthogonal are taken as X axis direction and Y axis direction.

The lens driving device 10 includes an annular magnet yoke 12, a plurality of permanent magnets 13, a lens support 14, a lens 15, a plurality of coil 16, a front side spring component 11A, a back side spring components 11B and a box body 14 disposed on the outer circumference side of the lens support 14.

The magnet yoke 12 includes an outer circumference wall 12a formed to be cylindrical shaped when being observed in the Z axis direction and a circular plate-shaped top surface 12c which is connected with the +Z side end of the outer circumference wall 12a and is provided with an opening in the inner side. The circular arc-shaped permanent magnets 13 arranged in a circle are mounted on the inner side of the outer peripheral wall 12a.

The lens support 14 is formed to be cylindrical, and the lens 15 is retained on the inner circumference part of the lens support 14. The lens support 14 is closer to the inner circumference side than the permanent magnets 13 which are set on the inner side of the outer circumference wall 12a. That is, the permanent magnets 13 are configured between the lens support 14 and the outer circumference wall 12a. Moreover, the lens support 14 is supported by the spring components (the front side spring component 11A and the back side spring component 11B) in a suspension manner so as to move along the Z axis direction (the direction of the optical axis O of the lens 15). The spring components are composed of the front side spring component 11A mounted in the front of the direction of the optical axis O (Z axis) and the back side spring component 11B mounted at the back of the direction of the optical axis O (Z axis).

The coil 16 is mounted on the outer peripheral side of the lens support 14 in a manner that the coil and the permanent magnets 13 are oppositely arranged at an interval along the radial direction. In the embodiment, the coil 16 and the permanent magnets 13 are taken as an electromagnetic driving mechanism for driving the lens support 14 in the direction of the optical axis O (Z axis).

Figure 2A:
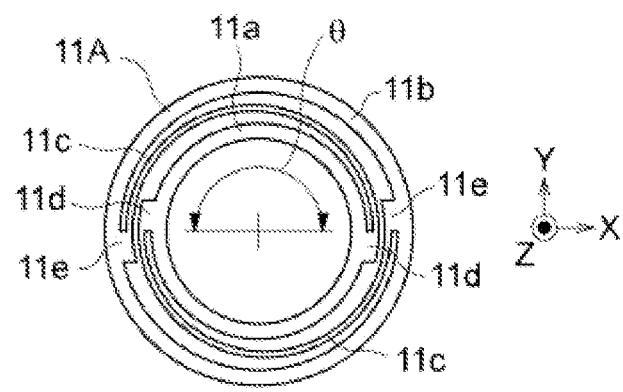
FIG. 2A and FIG. 2B are plane views of the front side spring component and the back side spring component used in the lens driving device in according to an embodiment of the present invention.

As shown in FIG. 2A, the front side spring component 11A includes a circular ring-shaped inner side retaining part 11a, a circular ring-shaped outer side retaining part 11b, two approximately circular arc-shaped wrist parts 11c, two inner side connecting parts 11d and two outer side connecting parts 11e. The inner side retaining part 11a is mounted on the lens support 14 and is positioned on the inner circumference sides of the wrist parts 11c. The outer side retaining part 11b is mounted on the side of the box body 17 and is positioned on the outer circumference sides of the wrist parts 11c. The two wrist parts 11c extend along the circumferential direction at the +Y axis side and the −Y axis side respectively and are used for connecting the inner side retaining part 11a with the outer side retaining part 11b. Each of the inner side connecting part 11d extends to a corresponding one of the wrist parts 11c positioned in the radial outer side from the inner side retaining part 11a and is used for connecting one end of the corresponding wrist part 11c with the inner side retaining part 11a. Each of the outer side connecting part 11e extends to a corresponding one of the wrist parts 11c positioned in the radial inner side from the outer side retaining part 11b and is used for connecting the other end of the corresponding wrist part 11c with the outer side retaining part 11b. An extending angle θ in the circumferential direction from the inner side connecting part 11d to the outer side connecting part 11e, or in other words a central angle of each wrist part with respect to the optical axis, is 180 degrees.

Figure 2B:
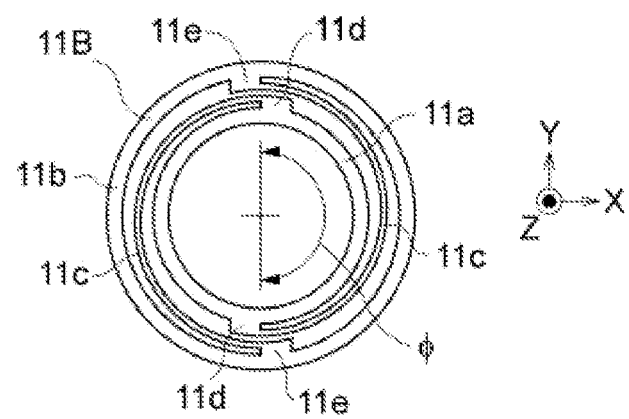

As shown in FIG. 2B, the back side spring component 11B includes a circular ring-shaped inner side retaining part 11a, a circular ring-shaped outer side retaining part 11b, two approximately circular arc-shaped wrist parts 11c, two inner side connecting parts 11d and two outer side connecting parts 11e. The inner side retaining part 11a is mounted on the lens support 14 and is positioned on the inner circumference sides of the wrist parts 11c. The outer side retaining part 11b is mounted on the side of the box body 17 and is positioned on the outer circumference sides of the wrist parts 11c. The two wrist parts 11c extend along the circumferential direction at the +X axis side and the −X axis side respectively and are used for connecting the inner side retaining part 11a with the outer side retaining part 11b. Each of the inner side connecting part 11d extends to the wrist part 11c positioned in the radial outer side from the inner side retaining part 11a and is used for connecting one end of the corresponding wrist part 11c with the inner side retaining part 11a. Each of the outer side connecting part 11e extends to the wrist part 11c positioned in the radial inner side from the outer side retaining part 11b and is used for connecting the other end of the corresponding wrist part 11c with the outer side retaining part 11b. The extending angle φ in the circumferential direction from the inner side connecting part 11d to the outer side connecting part 11e, or in other words a central angle of each wrist part, is 180 degrees.

The inner side retaining parts 11a of the front side spring component 11A and the back side spring component 11B are respectively connected with the front side and the back side of the lens support 24 in the Z axis direction. Moreover, the outer side retaining parts 11b of the front side spring component 11A and the back side spring component 11B are respectively connected with the front side and the back side of the magnet yoke 17 in the Z axis direction arranged on the box body 17. Moreover, the outer circumference wall 12a of the magnet yoke 12 is inlaid in the inner side of the cylindrical side wall 17a vertically arranged on the periphery of the box body 17, and thus the lens driving device 10 is formed.

As a result, the wrist parts 11c of the front side spring component 11A and the wrist parts 11c of the back side spring component 11B are respectively arranged at corresponding positions which corresponds to positions formed by rotating (twisting) the back side spring component 11B and the front side spring component 11A by 90 degrees when being observed in the direction of the optical axis O of the lens 15.

Figure 3:
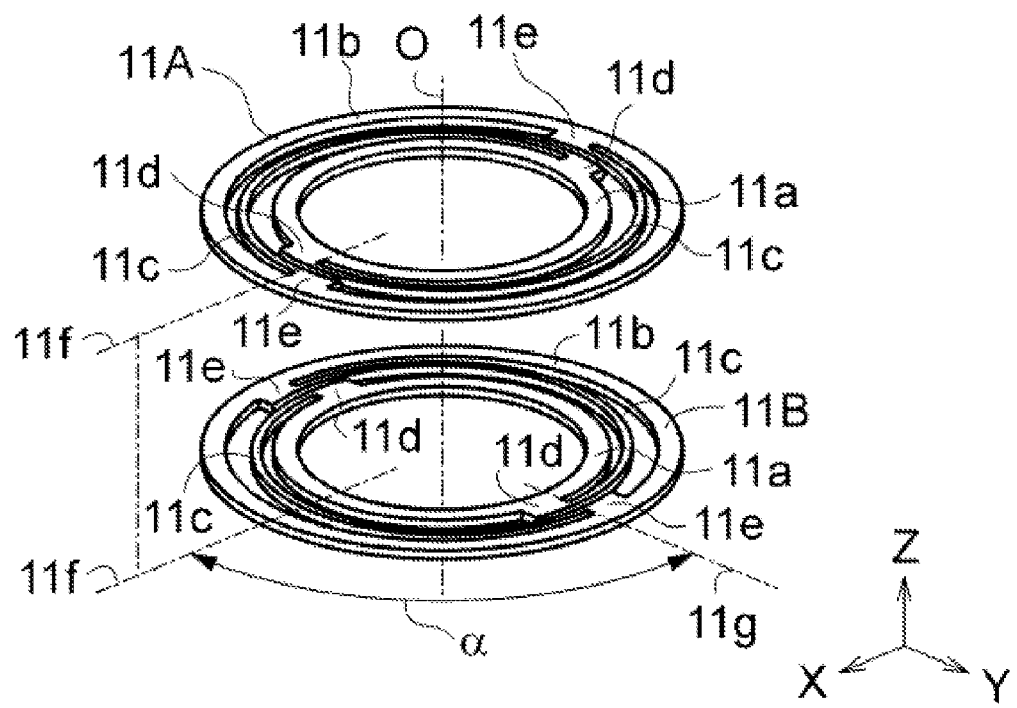
FIG. 3 is a perspective view of the front side spring component and the back side spring component used in the lens driving device in according to an embodiment of the present invention.

Namely, as shown in FIG. 3, when the connecting position, connected with the inner side connecting part 11d of the wrist parts 11c, of the front side spring component 11A is marked as 11f, and the connecting position, connected with the inner side connecting part 11d of the wrist parts 11c, of the back side spring component 11B is marked as 11g, the optical axis O is taken as the center, so that the front side spring component 11A and the back side spring component 11B are respectively mounted on the lens support 14 and the box body 17 in a manner that the twisting angle α from the connecting position 11f to the connecting position 11g is 90 degrees.

Moreover, when the coil 16 is electrified so as to enable the lens driving device 10 to adjust the focus, pushing force towards the front of the Z axis direction is applied to the coil 16. Therefore, the lens support 14 moves forward in the Z axis direction to a position where the pushing force and restoring force generated by the front side spring component 11A and the back side spring component 11B achieve a balance.

As mentioned above, the extending angle θ of the wrist parts 11c of the front side spring component 11A and the extending angle φ of the wrist parts 11c of the back side spring component 11B are all formed to be 180 degrees. Therefore, the spring strength of each wrist part 11c generated in any direction perpendicular to the Z axis is completely equivalent (equalization), and thus the strength deviation between the spring strength of the front side spring component 11A and the back side spring component 11B is reduced.

Namely, the spring strength of the wrist parts 11c of the front side spring component 11A and the wrist parts 11c of the back side spring component 11B generated in any direction perpendicular to the Z axis is equivalent, and the strength deviation of the spring strength in a specific direction cannot occur. Therefore, even if under the condition that the optical axis O is disposed in a horizontal direction and the load generated by the lens 15, the lens support 14 and the coil 16 is applied to the wrist parts 11c of the front side spring component 11A and the wrist parts 11c of the back side spring component 11B in a direction perpendicular to the Z axis, the lens support 14 is enabled to move along the vertical direction at the state that the optical axis O is maintained in a horizontal direction. And thus the lens support 14 cannot incline around the axis perpendicular to the Z axis.

Moreover, the front side spring component 11A and the back side spring component 11B are disposed at the state that the respective wrist parts 11c rotate by 90 degrees one by one, and are respectively connected with the lens support 14 when the state is maintained. Therefore, even if the lens support 14 moves along the Z axis direction so as to adjust the focus, the lens support 14 is difficult to incline around an axis perpendicular to the Z axis, and the shot image with little distortion and deformation can be obtained.

Moreover, in the embodiment, the extending angles θ and φ of the wrist parts 11c of the front side spring component 11A and the wrist parts 11c of the back side spring component 11B are respectively set to be 180 degrees, but it is not limited to this, as long as the extending angles are formed to be at least 180 degrees.

Figure 4A:
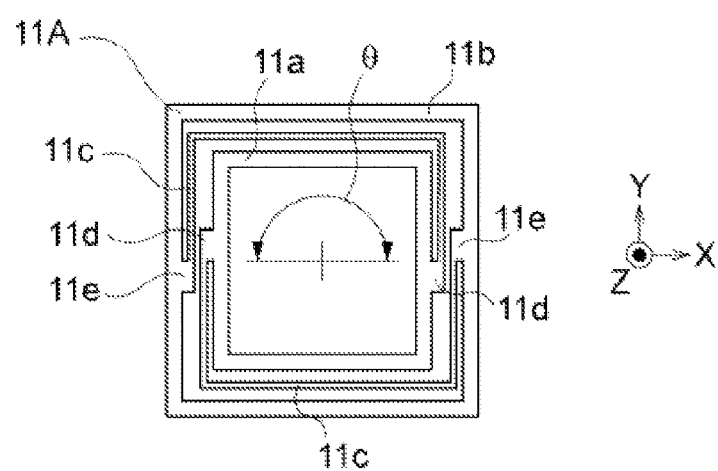
FIG. 4A and FIG. 4B are plane views of another example of the front side spring component and the back side spring component used in the lens driving device in according to an embodiment of the present invention.
Figure 4B:
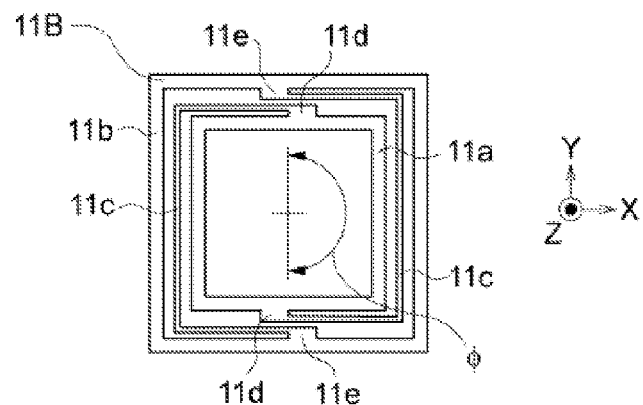

FIG. 4A and FIG. 4B are plane views of another example illustrating the front side spring component 11A and the back side spring component 11B suitable for the lens driving device 10 in the embodiment.

In the example, the shapes of the front side spring component 11A and the back side spring component 11B are different from that as shown in FIG. 1 to FIG. 3. Moreover, the shapes of the front side spring component 11A and the back side spring component 11B of the lens driving device 10 in this embodiment are different from that in the embodiment as shown in FIG. 1, and besides, the structures of the magnet yoke 12, the permanent magnets 13, the lens support 14, the lens 15, the coil 16 and the box body 17 are the same as that in the embodiment as shown in FIG. 1. Moreover, the shape of each component can be appropriately changed as long as the shape of each component is matched with the shapes of the front side spring component 11A and the back side spring components 11B.

As shown in FIG. 4A, the front side spring component 11A includes a square frame-shaped inner side retaining part 11a, a square frame-shaped outer side retaining part 11b, two ⊐-shaped wrist parts 11c, two inner side connecting part 11d and two outer side connecting part 11e. The inner side retaining part 11a is mounted on the lens support 14 and is positioned on the inner circumference side of the wrist parts 11c. The outer side retaining part 11b is mounted on the side of the box body 17 and is positioned on the outer circumference side of the wrist parts 11c. The two wrist parts 11c extend along the circumferential direction at the +Y axis side and the −Y axis side respectively and are used for connecting the inner side retaining part 11a with the outer side retaining part 11b. The two inner side connecting parts 11d extend to the wrist parts 11c positioned in the radial outer side from the inner side retaining part 11a and are used for connecting one ends of the wrist parts 11c with the inner side retaining part 11a. The two outer side connecting part 11e extend to the wrist parts 11c positioned in the radial inner side from the outer side retaining part 11b and are used for connecting the other ends of the wrist part 11c with the outer side retaining part 11b. The extending angle θ in the circumferential direction from the inner side connecting part 11d to the outer side connecting part 11e is 180 degrees.

As shown in FIG. 4B, the back side spring component 11B includes a square frame-shaped inner side retaining part 11a, a square frame-shaped outer side retaining part 11b, two ⊐-shaped wrist parts 11c, two inner side connecting part 11d and two outer side connecting part 11e. The inner side retaining part 11a is mounted on the lens support 14 and is positioned on the inner circumference side of the wrist parts 11c. The outer side retaining part 11b is mounted on the box body 17 and is positioned on the outer circumference side of the wrist parts 11c. The two ⊐-shaped wrist parts 11c extend along the circumferential direction at the +X axis side and the −X axis side and are used for mutually connecting the inner side retaining part 11a with the outer side retaining part 11b. The two inner side connecting parts 11d extend to the wrist parts 11c positioned in the radial outer side from the inner side retaining part 11a and are used for connecting one ends of the wrist parts 11c with the inner side retaining part 11a. The two outer side connecting part 11e extend to the wrist part 11c positioned in the radial inner side from the outer side retaining part 11b and are used for connecting the other ends of the wrist part 11c with the outer side retaining part 11b. The extending angle φ in the circumferential direction from the inner side connecting part 11d to the outer side connecting part 11e is 180 degrees.

Moreover, the wrist parts 11c of the front side spring component 11A and the wrist parts 11c of the back side spring component 11B are respectively arranged at corresponding positions where the wrist parts of the back side spring component 11B and the wrist parts 11c of the front side spring component 11A are rotated (twisted) by 90 degrees respectively when being observed in the direction of the optical axis O of the lens 15.

In this way, the extending angles θ of the wrist parts 11c of the front side spring component 11A and the extending angles φ of the wrist parts 11c of the back side spring component 11B are formed to be 180 degrees, so the spring strength of each wrist part 11c generated in any direction perpendicular to the Z axis is completely equivalent (equalization). And thus the strength deviation of the front side spring component 11A and the back side spring component 11B is reduced.

Thus, the spring strength of each wrist part 11c in the direction perpendicular to the Z axis is equivalent, and strength deviation cannot occur in the specific direction. Therefore, even if under the condition that the load generated by the lens 15, the lens support 14 and the coil 16 is applied to each wrist part 11c in a direction perpendicular to the Z axis, the lens support 14 can also move along the vertical direction at the state that the optical axis O is maintained in the horizontal direction, and the lens support 14 cannot incline around an axis perpendicular to the Z axis.

Moreover, the front side spring component 11A and the back side spring component 11B are disposed at the state that the respective wrist parts 11c rotate by 90 degrees one by one, and are respectively connected with the lens support 14. And therefore, even if the lens support 14 moves along the Z axis direction, the lens support 14 is difficult to incline around an axis perpendicular to the Z axis, and the shot image with little distortion and deformation can be obtained.

Figure 5:
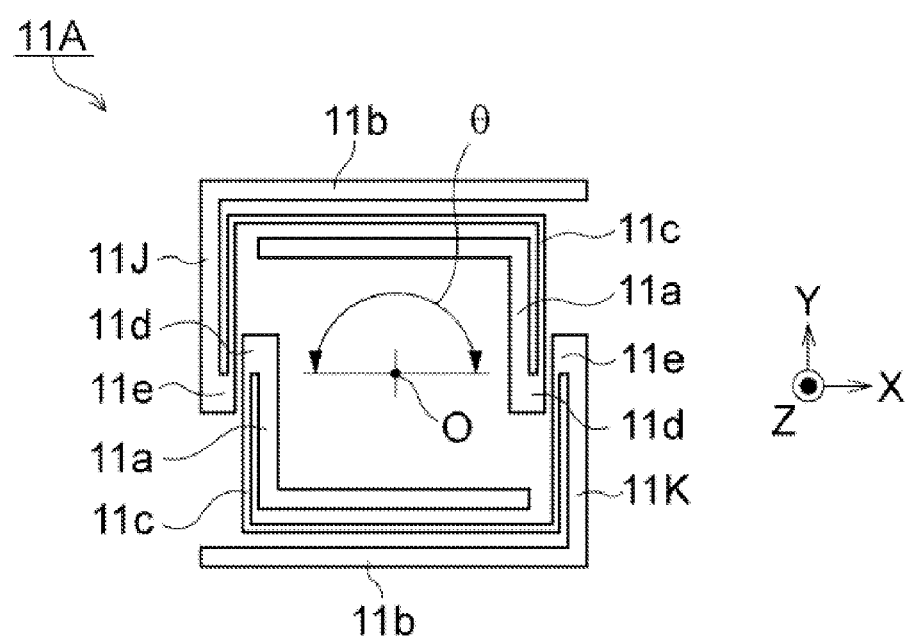
FIG. 5 is a plane view of another example illustrating the front side spring component used in the lens driving device in according to an embodiment of the present invention.

FIG. 5 is a plane view of further another example illustrating the front side spring component suitable for the lens driving device 10 in according to the an embodiment.

As shown in FIG. 5, the front side spring component 11A is divided equally into a front side spring component piece 11J on the +Y side and a front side spring component piece 11K on the −Y side, and the front side spring component piece 11J on the +Y side and the front side spring component piece 11K on the −Y side are disposed at corresponding positions in 180-degree rotational symmetry by taking the optical axis O as the center.

Each of the front side spring component piece 11J on the +Y side and the front side spring component piece 11K on the −Y side includes an L-shaped inner side retaining part 11a, an L-shaped outer side retaining part 11b, an ⊐-shaped wrist part 11c, an inner side connecting part 11d and an outer side connecting part 11e. The L-shaped inner side retaining part 11a is mounted on the lens support 14 and is positioned on the inner circumference side of the wrist part 11c. The L-shaped outer side retaining part 11b is mounted on the side of the box body 17 and is positioned on the outer circumference side of the wrist part 11c. The wrist part 11c extends along the circumferential direction and is used for connecting the inner side retaining part 11a with the outer side retaining part 11b. The inner side connecting part 11d extends to the wrist part 11c positioned in the radial outer side from the inner side retaining part 11a and is used for connecting one end of the wrist part 11c with one end of the inner side retaining part 11a. The outer side connecting part 11e extends to the wrist part 11c positioned in the radial inner side from the outer side retaining part 11b and is used for connecting the other end of the wrist part 11c with one end of the outer side retaining part 11b. The extending angle θ in the circumferential direction from the inner side connecting part 11d to the outer side connecting part 11e is 180 degrees.

Therefore, the spring strength of each wrist part generated in the direction perpendicular to the Z axis is completely equivalent (equalization), and strength deviation of the spring strength cannot occur in a specific direction. Even if when the optical axis O is at the horizontal state and under the condition that the load generated by the lens 15, the lens support 14 and the coil 16 is applied to the wrist parts 11c of the front side spring component 11A and the wrist parts of the back side spring component 11B in the direction perpendicular to the Z axis, the lens support 14 can also move along the vertical direction at the state that the optical axis O is maintained in a horizontal direction, and thus the lens support 14 cannot incline around an axis perpendicular to the Z axis.

Moreover, only the front side spring component 11A is illustrated in FIG. 5, but it is not limited to the front side spring component 11A, the back side spring component 11B also can be divided equally. Moreover, the following shape can also be formed, namely, only one of the front side spring component 11A and the back side spring component 11B is divided, and the other of the front side spring component 11A and the back side spring component 11B as shown in FIG. 2 or FIG. 3 is similarly divided. However, the key is that the extending angles of the wrist pats 11c of the front side spring component 11A and the back side spring component 11B are respectively formed to be at least 180 degrees.

Figure 6:
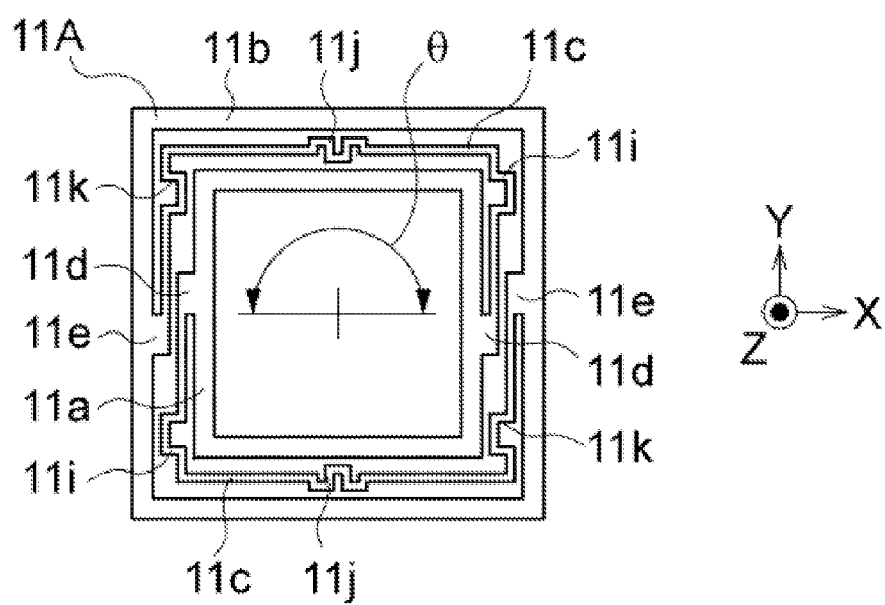
FIG. 6 is a plane view of another example illustrating the front side spring component used in the lens driving device in according to an embodiment of the present invention.
Figure 7:
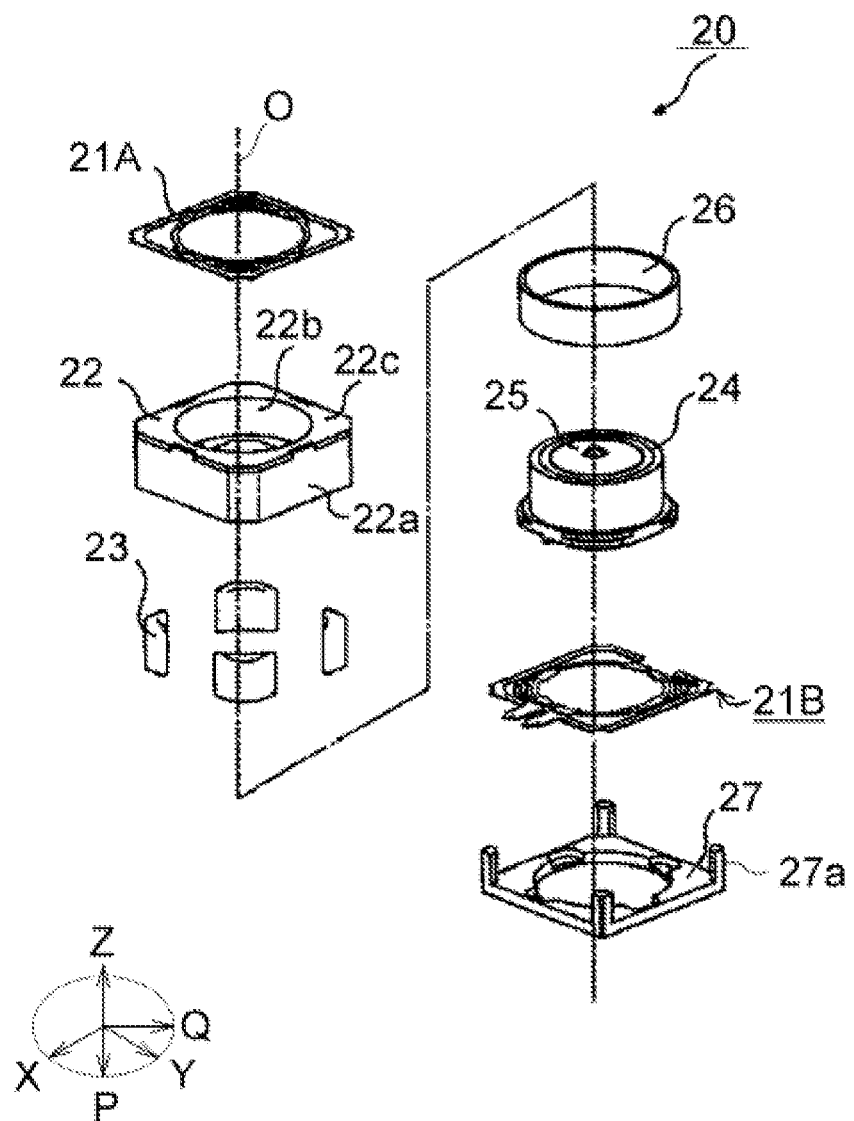
FIG. 7 is an exploded view of an existing lens driving device.
Figure 8:
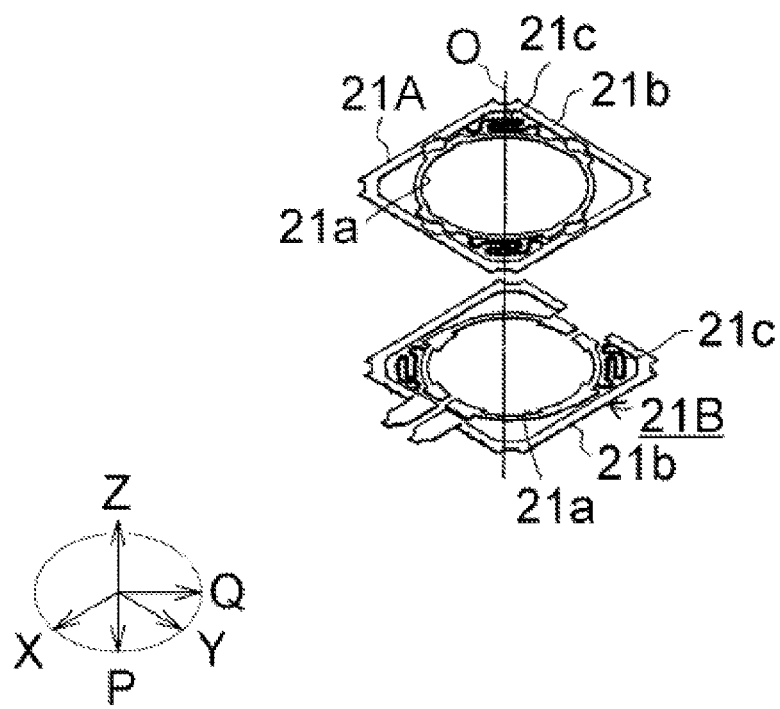
FIG. 8 is a perspective view of the front side spring component and the back side spring component used in the existing lens driving device.
Figure 9A:
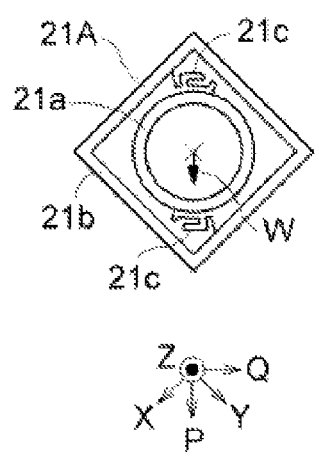
FIG. 9A, FIG. 9B, FIG. 9C, and FIG. 9D are mode patterns for illustrating inclination generated by the lens support in the existing lens driving device.
Figure 9B:
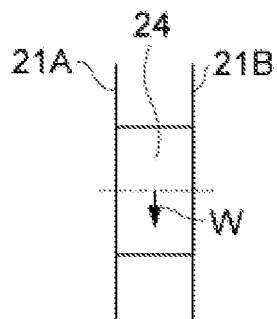
Figure 9B:
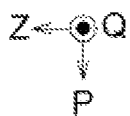
Figure 9C:
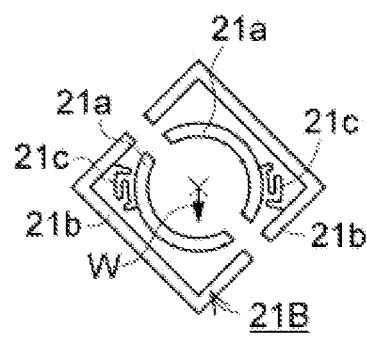
Figure 9C:
Figure 9D:
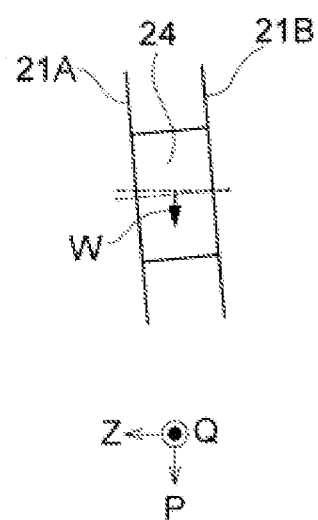

FIG. 6 is a plane view of yet another example illustrating a front side spring component 11A suitable for the lens driving device 10 in the embodiment.

As shown in FIG. 6, the front side spring component 11A includes a square frame-shaped inner side retaining part 11a, a square frame-shaped outer side retaining part 11b, two ⊐-shaped wrist parts 11c, two inner side connecting parts 11d and two outer side connecting parts 11e. The inner side retaining part 11a is mounted on the lens support 14 and is positioned on the inner circumference side of the wrist parts 11c. The outer side retaining part 11b is mounted on the side of the box body 17 and is positioned on the outer circumference side of the wrist parts 11c. The two wrist parts 11c extend along the circumferential direction on the +Y axis side and the −Y axis side respectively and are used for connecting the inner side retaining part 11a with the outer side retaining part 11b. The two inner side connecting part 11d extend to the wrist parts 11c positioned in the radial outer side from the inner side retaining part 11a and are used for connecting one ends of the wrist part 11c with the inner side retaining part 11a. The two outer side connecting part 11e extend to the wrist parts 11c positioned in the radial inner side from the outer side retaining part 11b and are used for connecting the other ends of the wrist part 11c with the outer side retaining part 11b. The extending angle θ in the circumferential direction from the inner side connecting part 11d to the outer side connecting part 11e is 180 degrees.

Moreover, a zigzag part 11i, a zigzag part 11j and a zigzag part 11k are respectively formed in the mutually perpendicularly three parts of each ⊐-shaped wrist part 11c. The zigzag part 11i is positioned between the inner side connecting part 11d and the zigzag part 11j, and is zigzagged along the radial direction. The zigzag part 11j is zigzagged along the radial direction and is formed on the +Y side and the −Y side in a mutually separated manner at the center part in the X axis direction. The zigzag part 11k is positioned between the outer side connecting part 11e and the zigzag part 11j, and is zigzagged along the radial direction. These zigzag parts 11i, 11j and 11k can alleviate impact when the wrist parts 11c receive impact in the directions perpendicular to the Z axis, so that the twisting is restrained.

Therefore, the spring strength of the respective wrist parts 11c of the front side spring component 11A and the back side spring component 11B in the directions perpendicular to the Z axis is completely equivalent (equalization), and strength deviation cannot occur in a specific direction. Even if when the optical axis O is arranged to be horizontal and under the condition that the load generated by the lens 15, the lens support 14 and the coil 16 is applied to the wrist parts 11c of the front side spring component 11A and the wrist parts 11c of the back side spring component 11B in the directions perpendicular to the Z axis, the lens support 14 can also move along the vertical direction at the state that the optical axis O is maintained in the horizontal direction, but the lens support 14 cannot incline around an axis perpendicular to the Z axis.

Moreover, in FIG. 6, the example that the zigzag parts 11*i*, 11*j* and 11*k* are formed on the wrist parts 11*c* of the front side spring component 11A is illustrated, but the zigzag parts 11*i*, 11*j* and 11*k* can also be formed in the back side spring component 11B. Moreover, the zigzag parts 11*i*, 11*j* and 11*k* can also be formed in any of the front side spring component 11A and the back side spring component 11B, but are not formed in the other component. However, the key is that the extending angles of the wrist pats 11*c* of the front side spring component 11A and the back side spring component 11B are respectively formed to be at least 180 degrees.

Moreover, it is unnecessary that all the zigzag parts 11*i*, 11*j* and 11*k* are formed on a wrist part 11*c* at the same time, and when one or more than one of the zigzag parts 11*i*, 11*j* and 11*k* is formed in any wrist part 11*c*, the impact applied to the wrist parts 11*c* can also be alleviated. Moreover, the number of winding and zigzagging for each of the zigzag parts 11*i*, 11*j* and 11*k* is not restricted, and the number can be appropriately changed.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A lens driving device, comprising:
   a lens support for retaining a lens;
   a box body disposed on the outer circumference side of the lens support;
   two spring components for supporting the lens support in a suspension manner so that the lens support is capable of moving along an optical axis of the lens; and
   an electromagnetic driving mechanism for driving the lens support to move along the optical axis;
   wherein the two spring components is composed of
   a front side spring component mounted in the front of the direction of the optical axis and configured for supporting the lens support; and
   a back side spring component mounted at the back the direction of the optical axis and configured for supporting the lens support;
   wherein each of the front side spring component and the back side spring component comprising:
   a plurality of wrist parts extending along a periphery of the optical axis of the lens;
   an inner side retaining part arranged on the inner sides of the plurality of wrist parts and connected to the lens support; and
   an outer side retaining part arranged on the outer sides of the plurality of wrist parts and connected to the side of the box body; and
   wherein one ends of the plurality of wrist parts are connected with the inner side retaining part, the other ends of the plurality of wrist parts are connected with the outer side retaining part, and the extending angles of the plurality of wrist parts along the periphery of the optical axis are at least 180 degrees.

2. The lens driving device according to claim 1, wherein when the front side spring component is rotated by 90 degrees taking the optical axis as a center axis, positions where the plurality of wrist parts and the inner side retaining part of the front side spring component are connected are corresponding to positions where the plurality of wrist parts and the inner side retaining part of the back side spring component are connected.

* * * * *